United States Patent
Kyotani

(10) Patent No.: US 7,081,164 B2
(45) Date of Patent: Jul. 25, 2006

(54) CONVEYANCE METHOD AND APPARATUS FOR PROCESSING STEP

(75) Inventor: Hisashi Kyotani, Shiga (JP)

(73) Assignee: Daifuku Co., Ltd., Osaka (JP)

( * ) Notice: Subject to any disclaimer, the term of this patent is extended or adjusted under 35 U.S.C. 154(b) by 129 days.

(21) Appl. No.: 10/763,435

(22) Filed: Jan. 23, 2004

(65) Prior Publication Data

US 2004/0149542 A1    Aug. 5, 2004

(30) Foreign Application Priority Data

Jan. 24, 2003    (JP)    ............................. 2003-015888

(51) Int. Cl.
*B05C 19/02*    (2006.01)
*B05D 1/18*    (2006.01)

(52) U.S. Cl. ................... 118/423; 118/426; 427/430.1; 427/435

(58) Field of Classification Search ............. 198/345.1, 198/346.1; 118/423, 426; 427/327, 435, 427/430.1, 443.1; 134/32, 15, 25.4, 122 RR, 134/64 R, 142, 123, 45; 205/198, 234; 204/512
See application file for complete search history.

(56) References Cited

U.S. PATENT DOCUMENTS 6,090,254 A * 7/2000 Sobata et al. ............... 204/510

FOREIGN PATENT DOCUMENTS

| DE | 10103837 | * | 9/2002 |
| DE | 10210981 | * | 10/2003 |
| EP | 1506930 | * | 2/2005 |

* cited by examiner

*Primary Examiner*—Brenda A. Lamb
(74) *Attorney, Agent, or Firm*—D. Peter Hochberg; Sean Mellino; Katherine R. Vieyra

(57) ABSTRACT

An operating arm (12) supported on a movable body (3) is operated to move downwards, and a supporting body (14) located on the front end section of the operating arm (12) is rotated about an axis in the lateral direction of a processing line (L), whereby a conveyance object (M) supported on the supporting body (14) is immersed in a processing liquid in a processing liquid tank (1) and processed by the same. Furthermore, the conveyance object (M) is removed from the processing liquid, during which operation the supporting member (14) is rotated in accordance with the shape of the conveyance object (M), thereby controlling the angle of the conveyance object (M) upon introduction into the processing liquid, the angle of the conveyance object (M) during immersion in the processing liquid, and the angle of the conveyance object (M) upon removal from the processing liquid.

11 Claims, 13 Drawing Sheets

CONVEYANCE METHOD AND APPARATUS FOR PROCESSING STEP

BACKGROUND OF THE INVENTION

1. Field of the Invention

The present invention relates to a conveyance method and apparatus for a processing step which can be used in a conveyance line where processing is carried out, such as a coating line in a manufacturing plant where coating is carried out.

2. Description of the Prior Art

Prior art reference 1 (Japanese Unexamined Patent Publication No. 2-123011) and prior art reference 2 (Japanese Unexamined Patent Publication No. 63-275470) disclose coating devices wherein hangers are provided on movable trolley devices guided by a rail laid to follow a coating line, and vehicle bodies supported on the hangers are caused to descend to be immersed in a processing liquid tank.

In the arrangements described above, when a vehicle body is to be immersed in a processing liquid tank, it is caused to run along a rail which descends obliquely downwards, whereby the vehicle body descends and becomes immersed in the processing liquid. Moreover, in order to raise it from the processing liquid, it is caused to run along a rail which ascends obliquely upwards, whereby the vehicle body is removed from the processing liquid. Moreover, in the prior art reference 2, in order to adjust the angle of the vehicle body, wheels provided in front of and behind the trolley device are guided by a separate rail, and the travel rail and the inclining rail are provided with different angles of inclination, in such a manner that the hanger is inclined to a prescribed angle.

However, with variations in production steps, as is the case with small-volume multiple-model productions and the like, production lines which continuously convey vehicles of a same model are decreasing in number, and different types of vehicle bodies are conveyed successively instead. Furthermore, due to improvements in travel safety and the like, vehicle body shapes have become more complicated over the years. Accompanying such complication of vehicle body shapes, in production lines in which vehicle bodies of different shapes are conveyed, it is of essential importance for achieving satisfactory coating to correctly and simply adjust the angle of the vehicle body upon being introduced into the processing liquid and the angle of the vehicle body upon being removed from the same.

However, in the prior art references 1 and 2, it is not possible to adjust the angle of the vehicle body upon being introduced into the processing liquid or the angle of the vehicle body upon being removed from the same, for each different body shape. Hence there has been a problem in that the coating attitude or angle cannot be controlled for each vehicle model and vehicle body shape.

In view of the foregoing, the present invention has an object to provide a conveyance method and apparatus, which can be constituted inexpensively in a compact fashion, whereby the attitude or angle of a process object can be adjusted readily and freely with respect to a processing liquid, and different types of vehicle bodies can be processed satisfactorily by being immersed in a processing liquid.

SUMMARY OF THE INVENTION

One aspect of the present invention is a conveyance method for a processing step, wherein: while a movable body caused to move along a processing line (coating line), wherein a processing liquid tank is located at a prescribed position, is moving, or while the movable body is stationary, operating arms supported on the movable body are operated in a downward direction, in addition to which a supporting body provided on the front end sections of the operating arms is rotated about an axis in the lateral direction of the processing line, whereby a conveyance object supported on the supporting body is introduced into processing liquid in the processing liquid tank and processed, and the conveyance object is then removed from the processing liquid; the angle of the conveyance object upon introduction of the conveyance object into the processing liquid is controlled by means of the supporting body being rotated in accordance with the shape of the conveyance object; the angle of the conveyance object during immersion and processing of the conveyance object in the processing liquid is controlled by means of the supporting body being rotated in accordance with the shape of the conveyance object; and the angle of the conveyance object upon removal of the conveyance object from the processing liquid is controlled by means of the supporting body being rotated in accordance with the shape of the conveyance object.

Another aspect of the present invention is a conveyance apparatus for a processing step, comprising: a plurality of movable bodies capable of travelling along a processing line; a processing liquid tank located below the processing line; conveyance drive devices for causing the movable bodies to travel; operating arms supported operably in a downward direction on the movable body; a supporting body for supporting a conveyance object, held rotatably about rotating shafts on the front end sections of the operating arms; an arm operating device for operating the operating arms in a downward direction; and an angle adjusting device capable of adjusting the angle of the conveyance object by rotating the supporting body; wherein the operating arms are caused to operate in a downward direction by the arm operating device, while the movable body is being moved along the processing line by the conveyance drive devices, or while the movable body moved along the processing line is in a stationary state, the conveyance object supported on the supporting body is thereby immersed in the processing liquid in the processing liquid tank, and the angle of the conveyance object upon introduction into the processing liquid, the angle thereof during processing in the processing liquid, and the angle thereof upon removal from the processing liquid can be controlled respectively, by rotating the supporting body by means of the angle adjusting device, in accordance with the shape of the conveyance object.

According to one or the other or both aspects of the present invention, the operating arms of a movable body which moves along a processing line are operated in a downward direction and a conveyance object supported on the operating arms via a supporting body is introduced into a processing liquid in a processing liquid tank, immersed therein and then removed from same. In this case, by rotating the conveyance object, the conveyance object can be introduced into and removed from the processing liquid, at any desired angle, and furthermore, the angle of the conveyance object while in the processing liquid can also be selected as desired, thereby making it possible to process the conveyance object satisfactorily by introduction and immersion into a processing liquid, and removal from same, even if the conveyance object has a complicated structure. Moreover, even if the shape of the conveyance object changes, it is possible to control the angle of introduction and removal, and the angle during immersion in the processing liquid, in accordance with the individual characteristics of the object to be processed, and hence conveyance objects of different shapes can be processed in a satisfactory manner.

DESCRIPTION OF THE PREFERRED EMBODIMENTS

First Embodiment

In order to describe the present invention in more detail, a first embodiment is now described with respect to FIG. 1 to FIG. 9.

Figure 1:
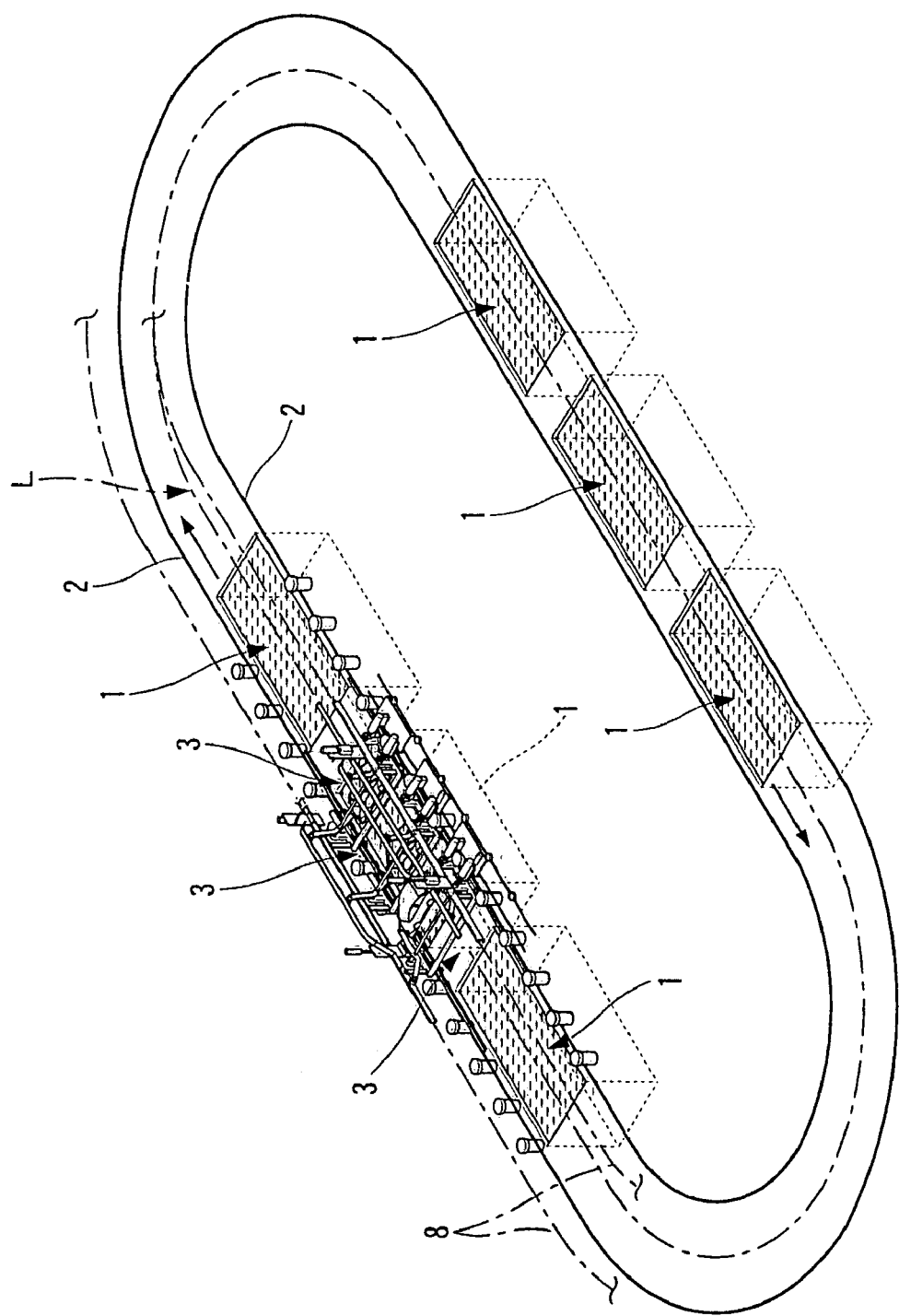
FIG. 1 is a general perspective view showing an embodiment of a coating line apparatus relating to the present invention.

As shown in FIG. 1, a coating line apparatus is applied to a coating line (processing line) L of an assembly process in an automobile factory, and the coating line L comprises an endless loop which is oval shaped in plan view or side view, and a square-shaped recovery circuit using a traverser which is a path-to-path movement device, between the outward path and the return path. A plurality of dip tanks (processing liquid tanks) 1 are located in prescribed positions on the coating line L, and coating liquids (processing liquids), and the like, for direct immersion are contained in these dip tanks 1, in addition to which coating electrode plates 1a, 1b (FIG. 4) are disposed selectively on the bottom face or the right or left-hand side faces of the dip tanks 1. FIG. 1 only depicts a single dip tank 1, the apparatus described below is disposed in each respective dip tank 1.

Figure 2:
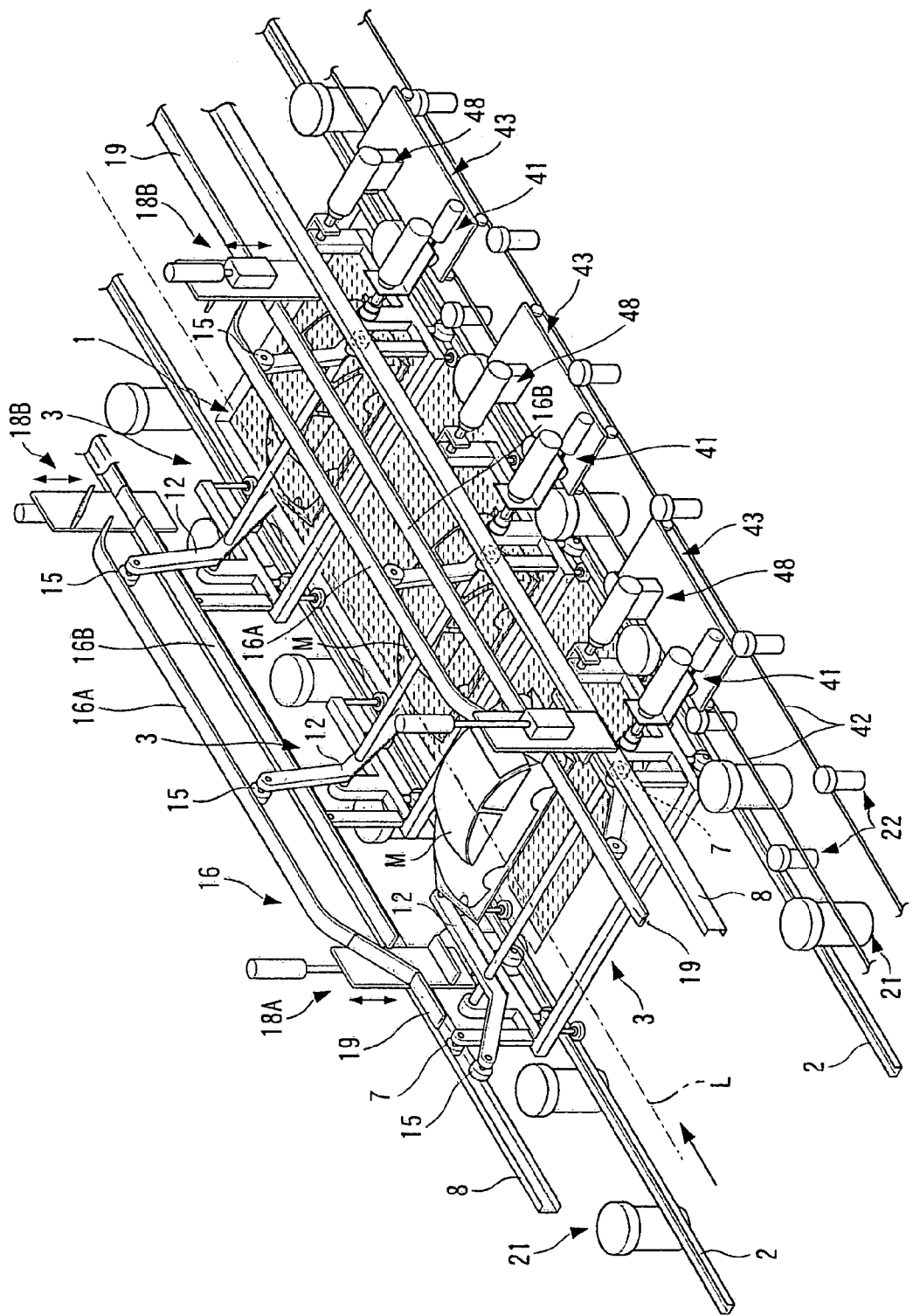
FIG. 2 is a perspective view showing a dip tank section of the coating line apparatus.
Figure 3:
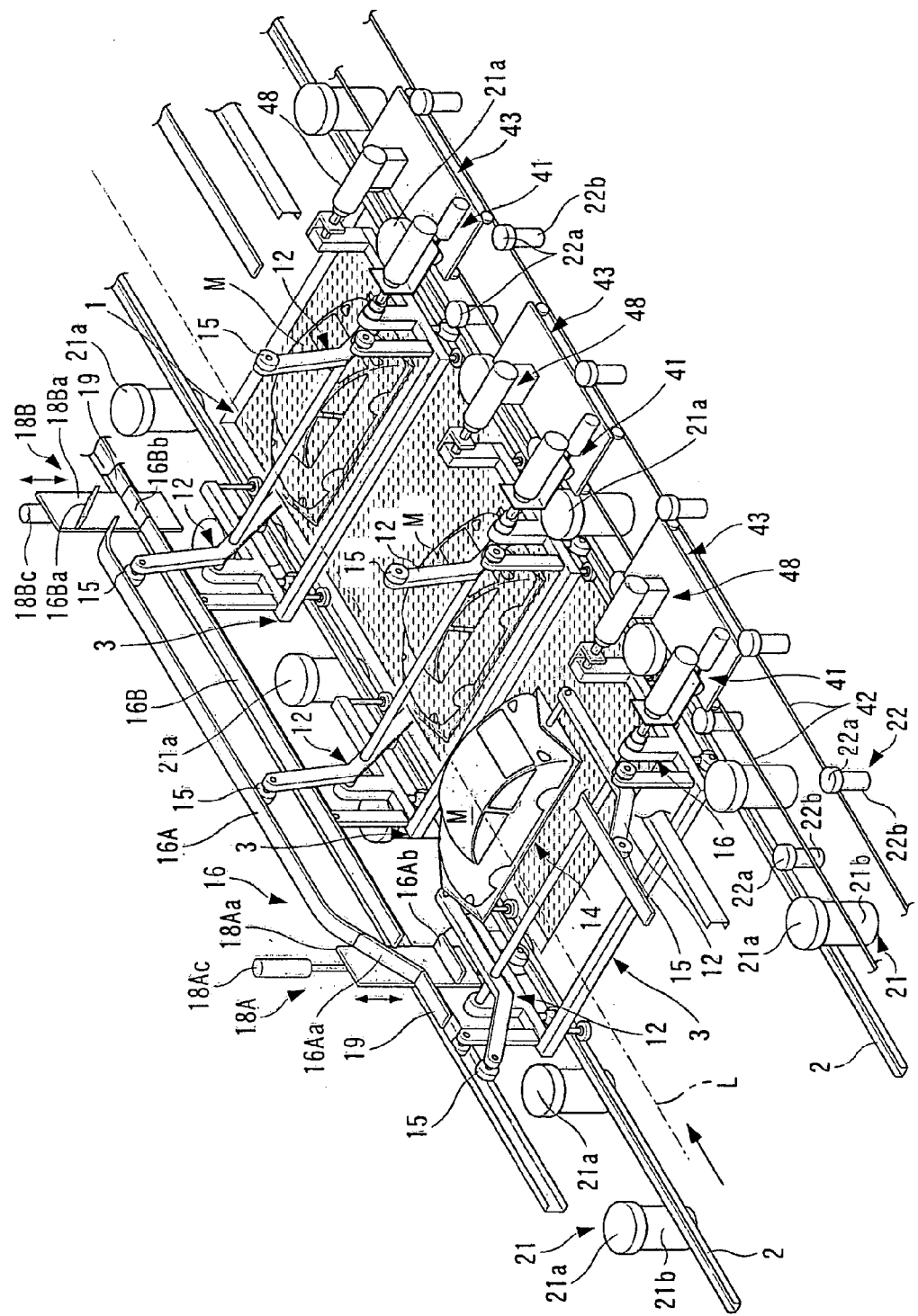
FIG. 3 is a partially cut away perspective view of the coating line apparatus.

As shown in FIG. 2 and FIG. 3, a pair of left and right-hand travel rails 2 passing on either side of the dip tank 1 are laid on the floor surface along the coating line L, and a plurality of conveyance carriages (movable bodies) 3 respectively having a vehicle body M which is a conveyance object, loaded and supported thereon, are arranged in such a manner that they can travel by being guided by the travel rails 2. Here, the "conveyance carriage" is a carriage which travels on the floor surface, and the "movable body" signifies a generic concept of a carriage including the "conveyance carriage", which travels not only on the floor surface but on a ceiling or side walls while being guided by guiding bodies such as rails arranged thereon.

Figure 4:
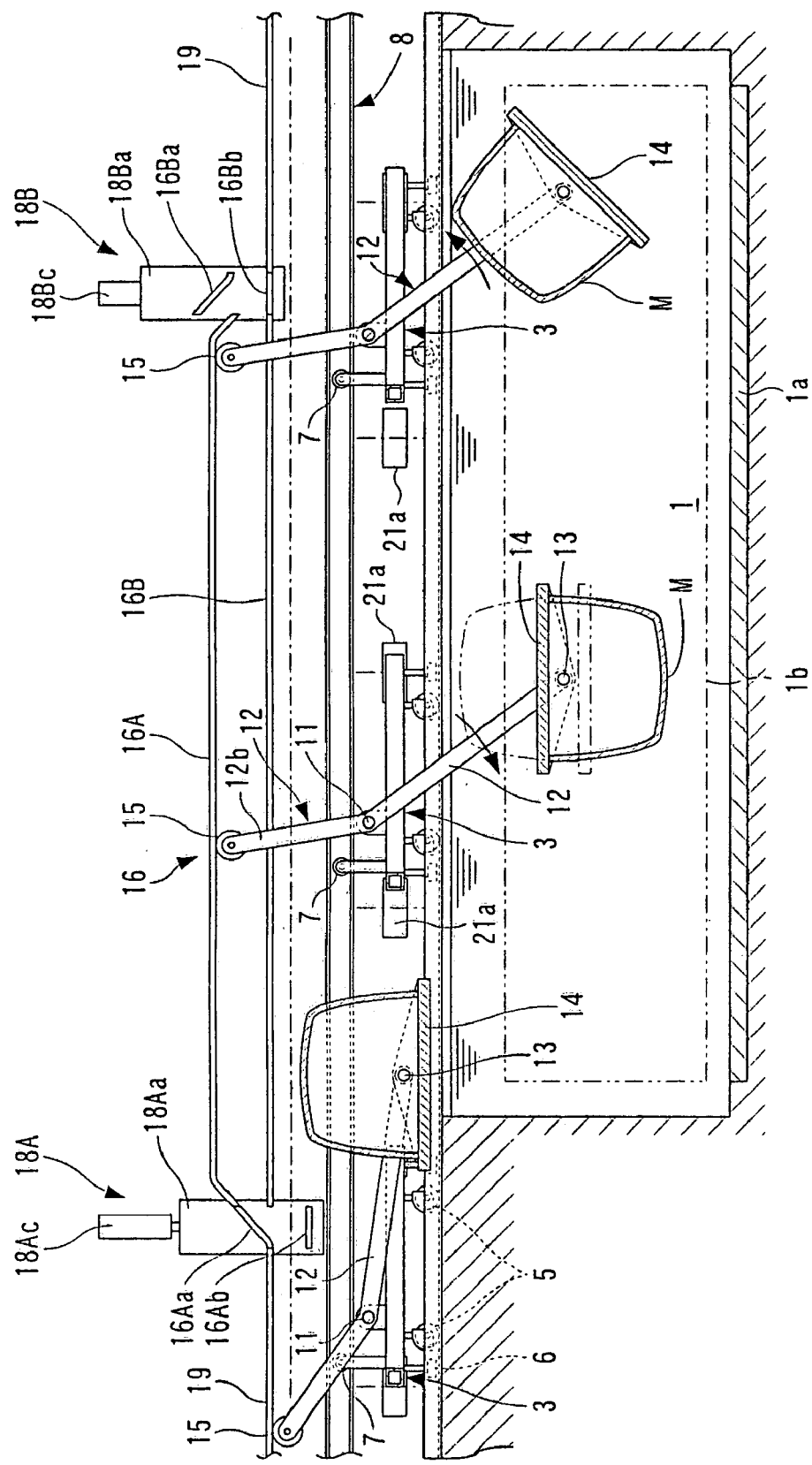
FIG. 4 is a longitudinal sectional view of the coating line apparatus.
Figure 5:
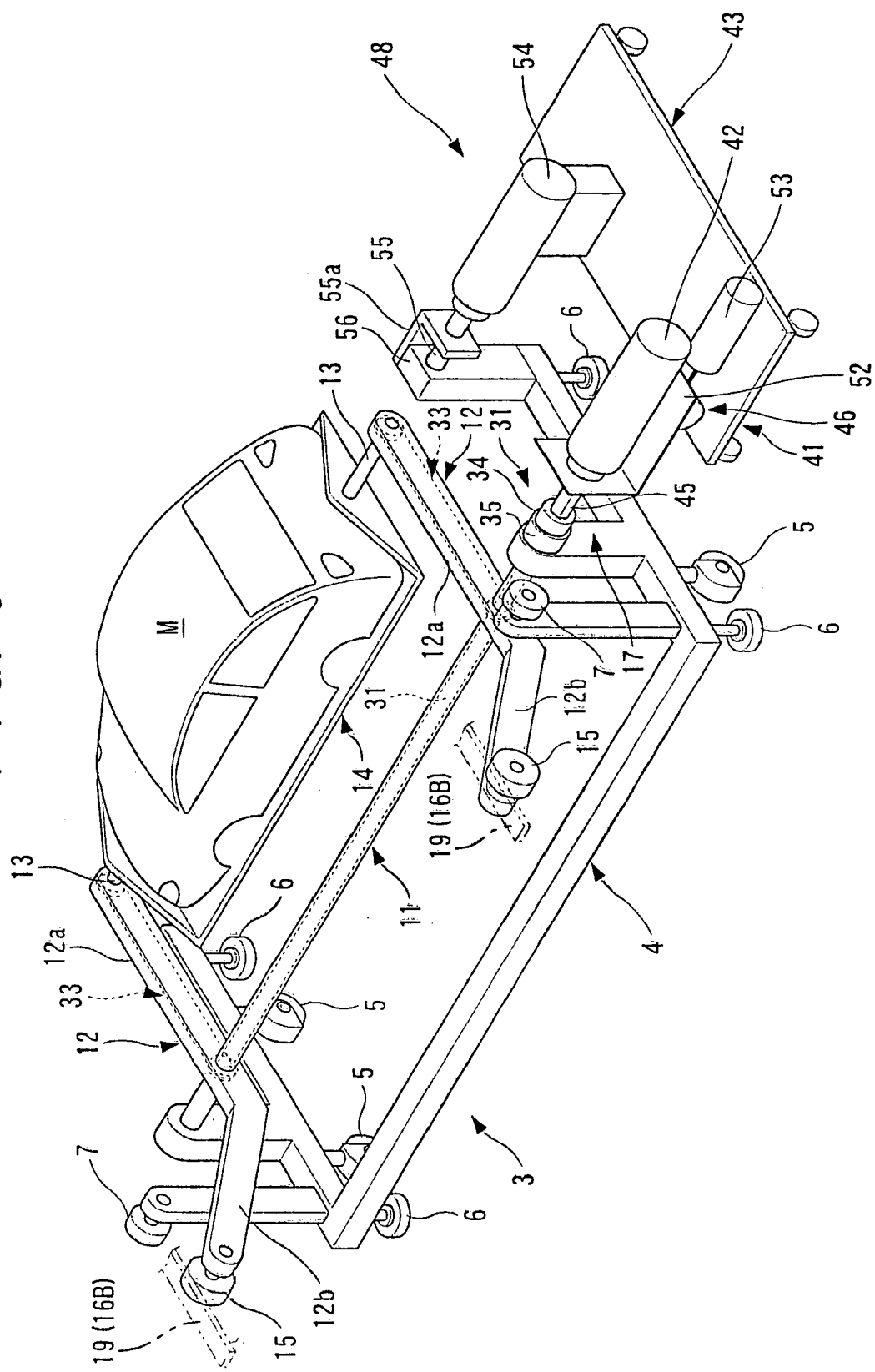
FIG. 5 is a perspective view showing a state of a conveyance carriage during conveyance in the coating line apparatus.
Figure 6:
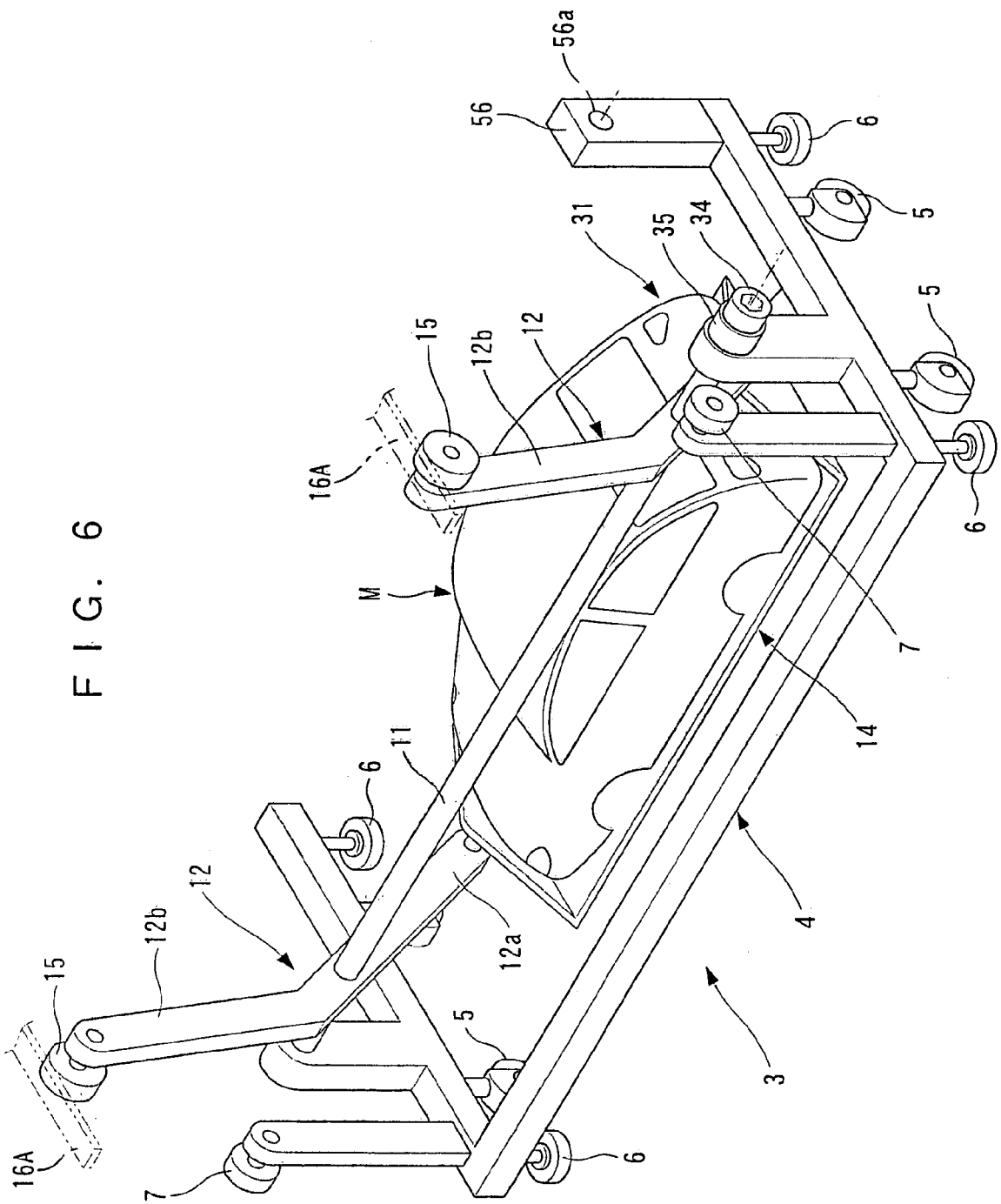
FIG. 6 is a perspective view showing a state of the conveyance carriage during a coating operation in the coating line apparatus.

As illustrated in FIG. 4 and FIG. 5, the conveyance carriages 3 each comprise a channel-shaped carriage frame 4 which is open at the front portion thereof in the direction of travel when observed in plan view, travelling wheels 5 provided on the four corner position of the carriage frame 4 and guided by the travel rails 2, anti-vibration wheels 6 provided on the carriage frame 4 and abutting rotatably against the travel rails 2 from the outer side thereof, and a pair of left and right-hand anti-float rollers 7 located on the rear portion of the carriage frame 2 by means of supporting members, these left and right-hand anti-float rollers 7 abutting against anti-float rails 8 located above the travel rails 2, from the under side thereof, and thereby preventing the conveyance carriage 3 from floating upwards.

A tubular tilting shaft (operating shaft) 11 is supported rotatably about an axis of rotation, in line with the lateral direction of the coating line L, between a pair of left and right-hand supporting members on the rear portion of the carriage frame 4, and a pair of left and right-hand tilting arms (operating arms) 12 are installed on this tilting shaft 11. A vehicle body supporting frame (supporting body) 14 is supported rotatably between drive arm sections 12a at the front ends of the tilting arms 12, by means of rotating shafts 13 which lie parallel with the tilting shaft 11. A vehicle body (conveyance object) M is loaded and supported on this vehicle body supporting frame 14 via holding members (not illustrated). Moreover, cam rollers (driven members) 15 are supported rotatably on the front end portions of passive arm sections 12b provided on the rear end sides of the left and right-hand tilting arms 12, and a passive section of an arm tilting device (arm operating device) 16 is constituted by the passive arm sections 12b and the cam rollers (driven members) 15.

A composition is adopted wherein a vehicle body M is loaded onto the vehicle body supporting frame 14 in such a manner that it assumes a laterally oriented angle, in a transverse direction which is perpendicular to the direction of conveyance, and by this means, the length of the dip tanks 1 in the direction of the coating line L is reduced, and hence compactification of the coating line apparatus can be achieved. Naturally, it is also possible to adopt a composition wherein the vehicle body M is loaded in a longitudinally oriented angle, facing the direction of conveyance.

A conveyance drive device (movable body drive device) for driving the conveyance carriages 3 and causing them to travel, is constituted by main friction roller device (roller pressure type drive device) 21 having conveyance drive rollers 21a located at a uniform pitch, on either side of the travel rails 2. The main friction roller device 21 is composed in such a manner that it grips the carriage frame 4 from the right and left-hand sides, by means of the conveyance drive rollers 21a, the travel drive force of the rollers being transmitted to the conveyance carriage 3 by means of the frictional force, and by respectively controlling conveyance drive devices 21*b* by means of respective conveyance drive control sections 21*c* (FIG. 9), it is possible to maintain the conveyance carriage 3 at a uniform speed, or to increase or decrease the speed thereof, or to halt the conveyance carriage 3.

In addition to the arm tilting device 16 which causes the tilting arms 12 of the conveyance carriage 3 to incline upwards and downwards, thereby causing the vehicle body M of the vehicle body supporting frame 14 to be immersed in the coating liquid in the dip tank, there is also provided an angle adjusting device 17 for rotating the vehicle body supporting frame 14 about the rotating shafts 13, thereby controlling the angle of immersion into the coating liquid, the coating angle therein, and the angle of removal from the coating liquid. The drive section of the arm tilting device 16 and the drive section of the angle adjusting device 17 may be mounted respectively on each individual conveyance carriage 3, but by providing them respectively for each dip tank 1, separately from the conveyance carriages 3, it is possible to simplify the structure of the conveyance carriages 3, of which there are a great number, and hence equipment costs can be reduced.

In other words, the drive section of the arm tilting device 16 comprises a plurality of cam rails (operating members) 16A, 16B (in the diagram, two such cam rails are provided), located along either side of the dip tank 1 and selected to correspond with the shape of the vehicle body M, and these cam rails 16A, 16B comprise operating cam rails (operating members) 16A which, by means of the cam rollers 15 of the conveyance carriage 3 abutting against same from below, cause the tilting arms 12 to tilt downwards, via the cam rollers 15, in accordance with the shape of the cam rail 16A, thus causing the vehicle body to be immersed in the dip tank 1 and coated, and non-operating cam rails (non-processing operating members) 16B which maintain the conveyance angle of the tilting arms 12 and do not cause the vehicle body to be immersed in the dip tank 1.

Restricting cam rails 19 having an approximately horizontal shape for maintaining the tilting arms 12 in the conveyance angle are located in the coating line L, outside of the sections which correspond to the dip tanks 1, and switching devices 18A and 18B are provided at the input section from the restricting rails 19 to the cam rails 16A, 16B, and at the output section from the cam rails 16A, 16B to the restricting rails 19. The switching device 18A at the input section comprises start side branching rail sections 16Aa, 16Ba located apart from each other by a prescribed distance in upper and lower positions on a support plate 18Aa, and a switching cylinder device 18Ac, which is a linear drive device for raising and lowering the support plate 18Aa. A composition is adopted wherein the support plate 18Aa is raised and lowered by the switching cylinder device 18Ac, the restricting rail 19 and the operating cam rail 16A are connected by the start side branching rail section 16Aa in the upper position, and the restricting rail 19 and the non-operating cam rail 16B are connected by the start side branching rail section 16Ba in the lower position. Moreover, the switching device 18B in the output section comprises end side incorporating rail sections 16Ba and 16Bb located apart from each other by a prescribed distance in upper and lower positions on a support plate 18Ba, and a switching cylinder device (linear drive device) 18Bc for raising and lowering the support plate 18Ba. By raising or lowering the support plate 18Ba by the switching cylinder device 18Bc, the operating cam rail 16A and the restricting rail 19 are connected by means of the end side branching rail section 16Ba in the upper position, and the non-operating cam rail 16B and the restricting rail 19 are connected by means of the end side branching rail section 16Bb in the lower position.

The angle adjusting device 17 is comprised of an angle adjusting passive section (passive section) 31 provided on the conveyance carriage 3, and an angle adjusting drive section (drive section) 41 provided on the floor surface separately from the conveyance carriage 3.

Figure 7:
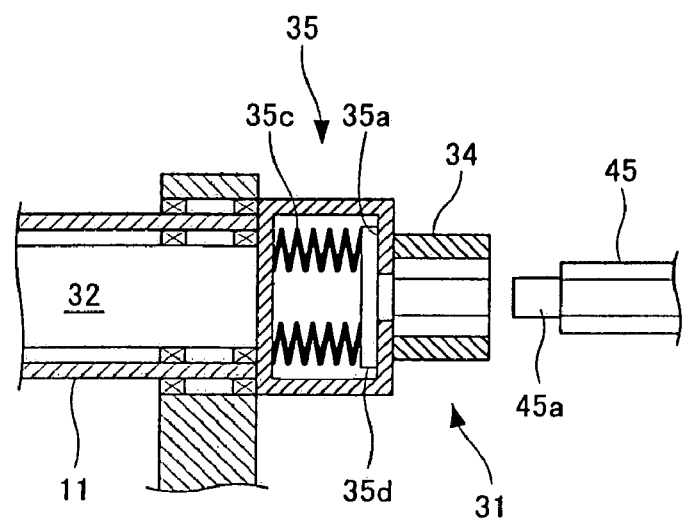
FIG. 7 is a perspective view showing a coupling with brake mechanism of the conveyance carriage in the coating line apparatus.

In the angle adjusting passive section 31, a transmission shaft (transmission shaft member) 32 located in a coaxial fashion inside the tilting shaft 11 which supports the tilting arms 12, is coupled to the movement of the rotating shaft 13 supporting the vehicle body supporting frame 14, by means of a wound transmission device (transmission mechanism) 33, such as a sprocket and chain arrangement, and as shown in FIG. 7, a coupling 34 having a brake mechanism 35 is attached to the right-end portion of the transmission shaft 32. Instead of the brake mechanism 35, it is also possible to provide a self-locking type reducing gear mechanism having a worm gear arrangement which allows the tilting arm 12 to be operated only from the transmission shaft 32.

Figure 9:
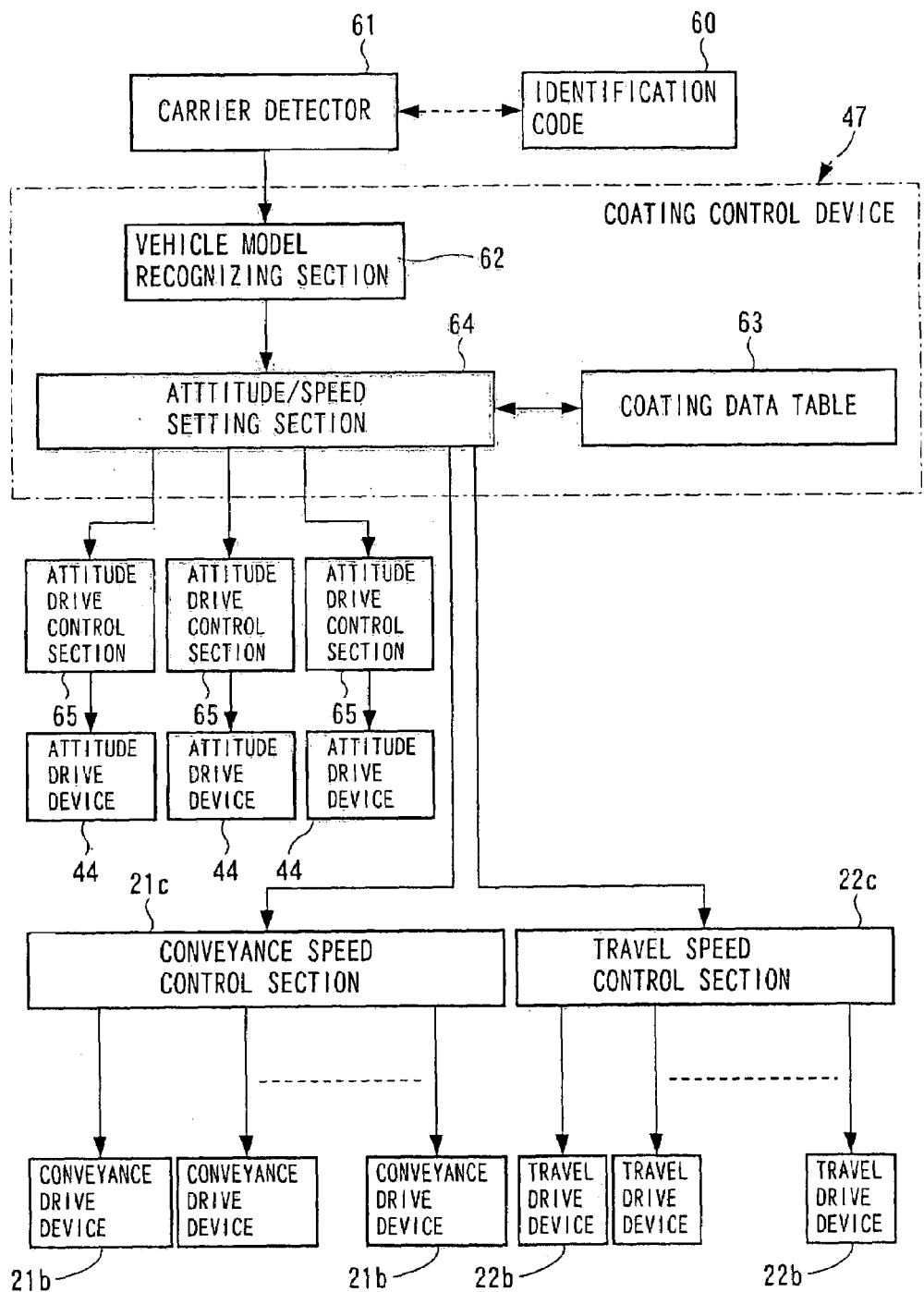
FIG. 9 is a control structure diagram for the coating line apparatus.

On the other hand, the angle adjusting drive section 41 comprises guide rails 42 located along the coating line L on the right-hand side of the dip tank 1, a travelling carriage 43 located movably back and forth on the guide rails 42, an angle adjusting drive device (electric motor) 44 having an angle adjusting shaft 45, mounted on the travelling carriage 43, a coupling mechanism 46 capable of coupling the angle adjusting shaft 45 to the coupling 34 of the angle adjusting passive section 31, and separating it from same, and, as illustrated in FIG. 9, a coating control device (processing control device) 47 for driving and controlling the angle adjusting drive device 44 in accordance with the shape of the vehicle body M supported on the vehicle body supporting frame 14, and thereby controlling the angle of immersion into the coating liquid, the angle of coating therein, and the angle of removal from same. Furthermore, a carriage coupling device (coupling mechanism) 48 for coupling and synchronizing the movement of the travelling carriage 43 to that of the conveyance carriage 3 is also provided on the travelling carriage 43.

In this coupling mechanism 46, a sliding platform 52 is located movably in the lateral direction of the travelling carriage 43, on the carriage frame 51 of the travelling carriage 43, by means of a guide member (not illustrated), and the angle adjusting drive device (electric motor) 44 is located on this sliding platform 52 with the angle adjusting shaft 45 thereof projecting towards the conveyance carriage 3. An adjusting shaft projecting and retracting cylinder (linear drive mechanism) 53 consisting of a hydraulically driven or pneumatically driven cylinder for causing the sliding platform 52 to be projected or retracted is provided on the carriage frame 51, and the angle adjusting drive device 44 is caused to project or retract in the lateral direction of the travelling carriage 43, via the sliding platform 52, by means of the adjusting shaft projecting and retracting device 53, in such a manner that the angle adjusting shaft 45 can be engaged with, or disengaged from, the coupling 34.

As shown in FIG. 7, the angle adjusting shaft 45 is shaped, for instance, with a hexagonal cross-section, and has a brake releasing projection 45*a* provided in a projecting manner on the front end portion thereof. On the other hand, a shaft hole 34*a* capable of coupling with the angle adjusting shaft 45 is formed in the coupling 34 provided on the transmission shaft 32, and a brake mechanism 35 is formed integrally on the rear side thereof, whereby the transmission shaft 32 is locked whenever the angle adjusting shaft 45 is not engaged therewith. This brake mechanism 35 comprises a brake disc 35*a* fixed to the transmission shaft 32 and coupling 34, a rotation restricting disc 35*d* provided on the rear face of the brake disc 35*a*, and an impelling member (in the diagram, a coil spring) 35 for pressing the rotation restricting disc 35*d* against the rear face of the brake disc 35*a*.

Consequently, when the angle adjusting shaft 45 is engaged with the shaft hole 35*a*, the brake releasing projection 45*a* is fitted in via a central hole 35*b* in the brake disc 35*a* and presses back the rotational restricting disc 35*d* against the force of the impelling member 35*c*, thereby separating it from the brake disc 35*a*, and hence releasing the locking of the tilting shaft 11. Moreover, if the angle adjusting shaft 45 is removed from the shaft hole 34*a*, then the rotation restricting disc 35*d* is pressed against the brake disc 35*a* by the impelling member 35*c*, and it prevents the brake disc 35*a* from rotating by means of frictional force, thereby locking the transmission shaft 32.

Figure 8:
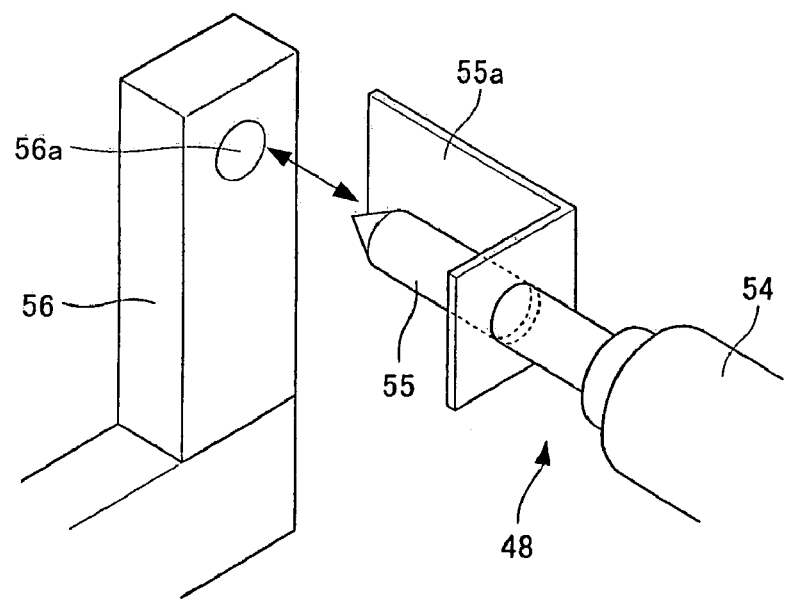
FIG. 8 is a partially enlarged perspective view showing a carriage coupling device in the coating line apparatus.

As shown in FIG. 8, the carriage coupling device 48 comprises a coupling element projecting and retracting device 54 mounted on the carriage frame 51 of the travelling carriage 43, which is capable of projecting and retracting a coupling pin 55 in the lateral direction of the travelling carriage 43, a passive element 56 provided on the carriage frame 4 of the conveyance carriage 3 and having an engagable pin hole 56*a*, and a restricting plate 55*a* provided on the coupling pin 55 and projecting to the front side of the passive element 56. When the travelling carriage 43 is caused to travel at low speed and it approaches a conveyance carriage 3, first of all, the coupling pin 55 is projected integrally with the restricting plate 55*a* by the coupling element projecting and retracting device 54 so as to cause the restricting plate 55*a* to abut against the front face of the passive element 56, thus performing positioning of the coupling pin 55 of the travelling carriage 43 in the pin hole 56*a* of the passive element of the conveyance carriage 3. Subsequently, the coupling pin 55 is further projected to engage in the pin hole 56*a* of the passive element 56, whereby the conveyance carriage 3 and the travelling carriage 43 become coupled and the travelling carriage 43 can be driven in synchronization with the conveyance carriage 3 by means of the carriage coupling device 48.

When separating the carriages, the coupling pin 55 and the restricting plate 55*a* are retracted by means of the coupling element projecting and retracting device 54, thereby to remove the coupling pin 55 from the pin hole 56*a*.

Figure 10:
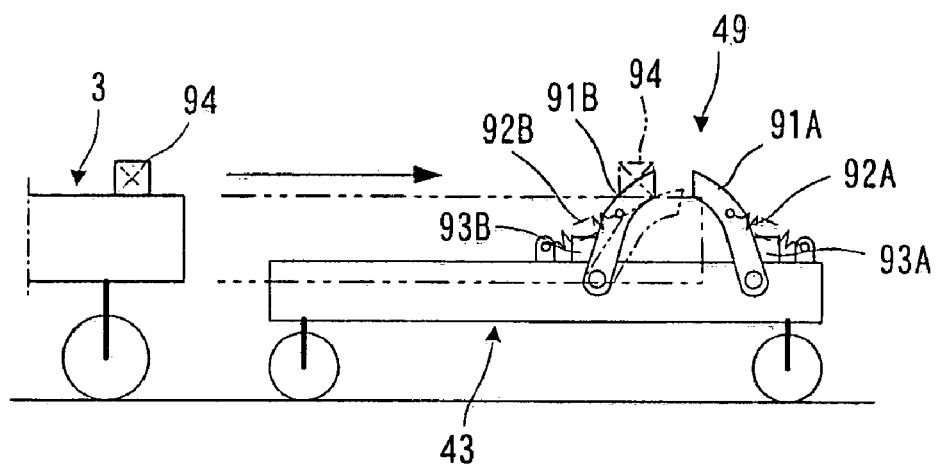
FIG. 10(a) and FIG. 10(b) are operational diagrams respectively showing another mode of the conveyance carriage.
Figure 10:
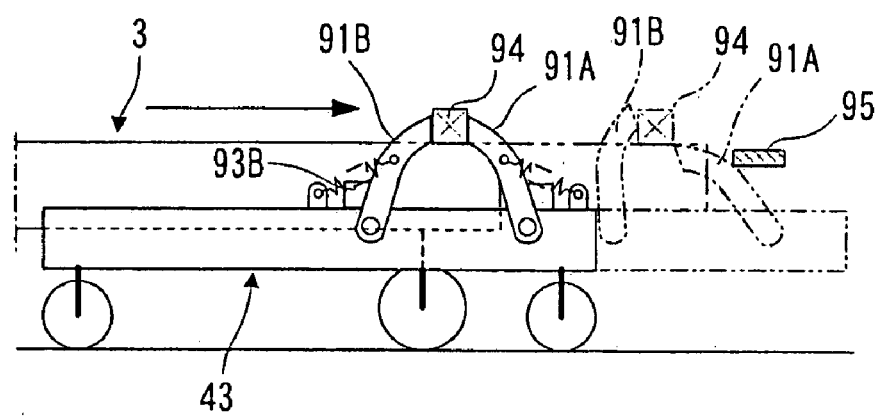

Moreover, a further possible embodiment of the carriage coupling device 43 described above is the carriage coupling device 49 shown in FIG. 10. In other words, this carriage coupling device 49 involves a pair of front and rear side gripping levers 91A, 91B, provided at front and rear position on the travelling carriage 43 and capable of rotating about horizontal pins provided in the lateral direction. Of this pair of front and rear side gripping levers 91A, 91B, the front side gripping lever 91A is impelled so as to rotate towards the front side by an impelling member 92A (a coil spring in the drawings), while at the same time, the rotation thereof towards the front side is restricted by a fixed restricting member 93A at a pressurizing position. Furthermore, the rear side gripping lever 91B is impelled so as to rotate towards the rear side by means of an impelling member 92*b* (a coil spring in the drawings), while at the same time, the rotation thereof towards the rear side is restricted by a movable restricting member 93B. Therefore, when a coupling rod 94 provided in a projecting manner on the side of the conveyance carriage 3 approaches, the rear side gripping lever 91B is pressed forwards by the coupling rod 94, the coupling rod 94 passes by the gripping lever 91B and it then engages with the front side gripping lever 91A. When this occurs, the rear side tripping lever 91B returns to its start position. Thereby, the conveyance force of the conveyance carriage 3 is transmitted from the conveyance carriage 3 to the travelling carriage 43 by means of the coupling rod 94. Furthermore, when the carriages are to be separated, a releasing member 95 fixed to an external point (on the floor surface) abuts against the front side gripping lever 91A, whereby the front side gripping lever 91A is pressed backwards and the coupling rod 94 is caused to pass by it in the forward direction. In this case, if it is necessary for the rear side gripping lever 91B to be rotated backwards, then a movable block 93A should be shifted in position in a rearward direction by means of a moving device (not illustrated) such as an actuator, cylinder device, or the like, provided on the travelling carriage 43.

As illustrated in FIG. 2 and FIG. 3, the travelling carriage movement device which causes the travelling carriage 43 to move back and forth reciprocally, along the coating line L, is constituted by subsidiary friction roller devices 22, which are roller pressure type drive devices located at a uniform pitch on either side of the guide rails 42. These subsidiary friction roller devices 22 are each constituted in such a manner that a travel drive roller 22*a* is driven in rotation by a travel drive device (electric motor) 22*b*, the carriage frame 51 being gripped between left and right-hand travel drive rollers 22*a* and travel drive force being transmitted to the travelling carriage 43 by frictional force. The rotational speed and the direction of rotation of the rotational drive rollers 22*a* are controlled by a travel speed control section 22*c* (FIG. 9) via a travel drive device 22*b*. It is also possible to adopt a free state when the conveyance carriage 3 is coupled by means of the carriage coupling device 48.

As shown in FIG. 9, the coating control device (processing control device) 47 is composed in such a manner that, as well as controlling the angle of the vehicle body M upon immersion into the liquid and removal from same, and the coating angle thereof while in the liquid, it is also able to control the movement speed of the conveyance carriage 3 by means of the main friction roller device 21, and to control the coating time and the distance between conveyance carriages 3. In other words, the coating control device 47 comprises: a carrier detector 61, installed in the coating line L in a position prior to the dip tank 1, for reading out identification codes 60, such as an ID tag or bar code, from the conveyance carriage 3; a vehicle model recognising section 62 for recognising the shape of the vehicle body M loaded onto the conveyance carriage 3 from a detection signal from the carrier detector 61, and an angle and speed setting section 64 for selecting control data, such as an immersion angle and coating angle, removal angle, movement speed, and the like, on the basis of the model (shape) from a coating data table 63. The angle and speed setting section 64 sends out control commands to an angle drive control section 65 which outputs control data to the angle drive device 44, the conveyance speed control section 21*c* of the main friction roller device 21, and the travel speed control section 22*c* of the subsidiary friction roller devices 22. Naturally, it is also possible for data on the vehicle body M loaded on the conveyance carriage 3 to be obtained from a host computer of the coating line apparatus, instead of via a carrier detector 61.

A coating operation performed in the coating line apparatus having the foregoing composition is now described.

A conveyance carriage 3 is caused to move along a coating line L by means of main friction roller devices 21, and when the conveyance carriage 3 approaches a dip tank 1, the identification code 60 on the conveyance carriage 3 is read out by the carrier detector 61, and the model of the vehicle body M loaded on the conveyance carriage 3 is recognised by the vehicle model recognising section 62. When model shape data has been input to the angle and speed setting section 64 from the coating data table 63, the angle and speed setting section 64 then outputs command data, such as an immersion angle, coating angle, and removal angle, for the vehicle body M, and a movement speed for the conveyance carriage 3 and travelling carriage 43, and the like, on the basis of this data.

Of a plurality of travelling carriages 43 (here, three are shown) waiting at a starting point on the upstream side of the dip tank 1, one travelling carriage 43 is moved by the subsidiary friction roller devices 22 to a position corresponding to the conveyance carriage 3, and the travelling carriage 43 is coupled to the conveyance carriage 3 by the carriage coupling device 48, by means of the coupling pin 55. Moreover, the angle adjusting shaft 45 is coupled to the coupling 34 by the coupling mechanism 46, thereby releasing the brake mechanism 35.

Thereupon, the switching device 18A (18B) is operated on the basis of an operating signal selected by the angle setting section 64 according to whether or not coating is to be performed in correspondence with the vehicle body M. If coating is to be performed, then at the input section, the restricting rails 19 are connected to the operating cam rails 16A via the start side branching rails 16Aa, by means of the switching devices 18A. Thereupon, at the output section, the operating cam rails 16A are connected to the restricting rails 19 via the end side branching rails 16Ba, by means of the switching devices 18B. Moreover, the switching devices 18B in the output section, are operated when the conveyance carriage 3 is to pass, taking into consideration the coating time. Furthermore, if coating is not to be performed, then at the input section, the restricting rails 19 are connected to the non-operating cam rails 16B via the start side branching rails 16Ab, and at the output section, the non-operating cam rails 16B are connected to the restricting rails 19 via the end side branching rails 16Bb.

If the vehicle body M is to be coated, then the cam rollers 15 of the conveyance carriage 3 are guided over the operating cam rails 16A, and by means of the cam rollers 15 along the operating cam rails 16A, the tilting arms 12 are caused to incline, and the vehicle body supporting frame 14 and the vehicle body M are immersed into the coating liquid in the dip tank 1. In this case, the vehicle body supporting frame 14 is caused to rotate by the angle adjusting drive device 44, via the angle adjusting shaft 45, the coupling 34, the transmission shaft 32, wound transmission mechanism 22 and rotating shafts 13, on the basis of operating signals from the angle and speed setting section 64, and hence the angle of the vehicle body M can be controlled to an optimum angle for immersion into the coating liquid. Moreover, while the vehicle body M is immersed in the coating liquid, the angle of the vehicle body M (coating angle) can be controlled to the optimum angle. Furthermore, the rotational speed of the conveyance drive devices 21b of the main friction roller devices 21 are controlled in such a manner that the movement speed of the conveyance carriage 3 is adjusted to an optimum speed, and hence the speed at which the vehicle body M is immersed into the coating liquid, the coating time, the speed at which the vehicle body M is removed from the coating liquid, and the intervals between the conveyance carriage 3 (vehicle body M) and adjacent conveyance carriages 3 before or after same, can all be controlled respectively to optimal values.

Furthermore, the tilting arms 12 are inclined upwards by the operating cam rails 16A, via the cam rollers 15, and the vehicle body M is removed from the coating liquid in the dip tank 1. In this case, the angle of the vehicle body M is controlled to an optimal angle for removal from the coating liquid, by the angle adjusting drive device 44, on the basis of operating signals from the angle and speed setting section 64. The cam rollers 15 are then returned to the restricting rails 19 via the end side incorporating rails 16Ab at the switching devices 18B, and the tilting arms 12 and the vehicle body supporting frame 14 are returned to the conveyance angle.

When the coating of the vehicle body M has been completed, the angle adjusting shaft 45 is retracted by the coupling mechanism 46, thereby separating it from the coupling 34, in addition to which, the brake mechanism 35 operates and the tilting arms 12 are locked in place, the coupling pin 55 is disengaged by the carriage coupling device 48, and hence the travelling carriage 43 is separated from the conveyance carriage 3.

In this way, even in the case of vehicle bodies M of different vehicle models, or vehicle bodies M of different metals (for example, aluminium), or vehicle bodies M having complex shapes from the viewpoint of design strength, it is still possible to form uniform coating layers over all surfaces, and to eliminate occurrence of air bubbles in the coating surfaces, and furthermore, the amount of coating liquid taken out from the dip tank 1 with the vehicle body can be effectively reduced.

The procedure described above is repeated successively for subsequent conveyance carriages 3, and when the last conveyance carriage 3 in the queue has passed the dip tank 1, the travelling carriages 43 are moved back in the reverse direction by the subsidiary friction roller devices 22, thus returning to the starting position, where they wait at standby.

According to the present embodiment described above, conveyance carriages 3 are moved respectively along a coating line L by means of main friction roller devices 21, the tilt arms 12 thereof are caused to incline by the arm tilting device 16, thereby causing the vehicle body M supported on the vehicle body supporting frame 14 of the tilting arms 12 to be immersed in a coating liquid in a dip tank 1, and furthermore, the vehicle body supporting frame 14 is caused to rotate by the angle adjusting device 17. Thereby, it is possible to introduce a vehicle body M into the coating liquid, and to remove it from same, at a desired angle, and since the angle can be set freely in this way, it is possible to process vehicle bodies M having a complicated structure, or vehicle bodies M of different materials, in a satisfactory manner.

Furthermore, by controlling the angle of the vehicle body M while immersed in the coating liquid to a suitable angle, in accordance with the positions at which electrodes 1a, 1b are located in the dip tank 1, it is possible to perform appropriate coating of the required film thickness in the required regions. Moreover, even if the type (shape) of vehicle body M supplied to the coating line L changes, it is possible to control the angles of introduction and removal into and out of the coating liquid, and the coating angle in the coating liquid, for each type of vehicle body M, and hence the vehicle body M can be coated in a satisfactory manner.

Furthermore, since the angle adjusting drive section 41 of the arm tilting device 16 is located in the vicinity of the dip tank 1 and separately from the conveyance carriage 3, then it is not necessary to provide a drive section on each of the conveyance carriages 3, and hence the conveyance carriages 3 can be simplified and reduced in weight, and the number of members therein can be reduced, thereby making it possible to cut manufacturing costs.

What is more, since the angle adjusting drive section 41 comprises an angle adjusting drive device 44 having an angle adjusting shaft 45 located on a travelling carriage 43 which can move in synchronization with the conveyance carriage 3, and a coupling mechanism 46 capable of coupling and decoupling the angle adjusting shaft 45 to and from a coupling 34 of the angle adjusting passive section 31 of the angle adjusting device 17 which is able to rotate the vehicle body supporting frame 14, then it is possible to control the angle of the vehicle body supporting frame 14 of the conveyance carriage 3 passing through the dip tank 1, in a highly accurate manner, by means of a simple composition for coupling the angle adjusting shaft 45 to the coupling 34 by means of the coupling mechanism 46. Furthermore, in the angle adjusting passive section 31, since a wound transmission mechanism 33 for connecting and coupling a transmission shaft 32 fitted coaxially inside the tilting shaft 11, and a rotating shaft 13 of the vehicle body supporting frame 14, is provided within the tilting arm 12, then a simple structure can be achieved wherein the tilting arm 12 and angle adjusting passive section 31 are mutually integrated, and hence countermeasures against staining by the coating liquid can be readily implemented.

Moreover, since the arm tilting device 16 is constituted by cam rollers 15 provided on the rear ends of the tilting arms 12, and cam rails 16A, 16B for guiding the cam rollers 15, provided along the path of the coating line L, then the tilting arms 12 which support the heavy weight of the vehicle body M can be caused to incline readily and highly accurately by means of the cam rollers 15, and furthermore, by changing the shape of the cam rails 16A, it is also possible readily to change the position of introduction into the coating liquid, the position of removal from the coating liquid, and the depth of immersion of the vehicle body M in the coating liquid. By providing a plurality of different cam rails 16A, 16B in a parallel fashion along the coating line L, and providing switching devices 18A, 18B at the input section and output section, it is possible to switch between non-processing and processing for each conveyance carriage 3, in accordance with the shape of the vehicle body M.

The type (shape) of the vehicle body M loaded on the conveyance carriage 3 is judged by the coating angle control device 47, on the basis of detection signal from the carrier detector 61, and the movement speed of the conveyance carriage 3, the angle of introduction into the coating liquid, the coating angle during immersion in the coating liquid, and the angle of removal from the coating liquid can all be controlled in accordance with the type of vehicle body M. Consequently, even if vehicle bodies M of different types are supplied in a successive fashion, it is still possible to achieve an optimum coating operation. Furthermore, by controlling the movement speed of the conveyance carriage 3 by means of the main friction roller devices 21, it is possible to control the interval between the vehicle bodies M on adjacent conveyance carriages 3, and therefore the interval to the preceding and following conveyance carriages 3 can be set to a narrow interval, without causing a decline in coating quality, thus making it possible to carry out the coating operation in a highly efficient manner.

Second Embodiment

Figure 11:
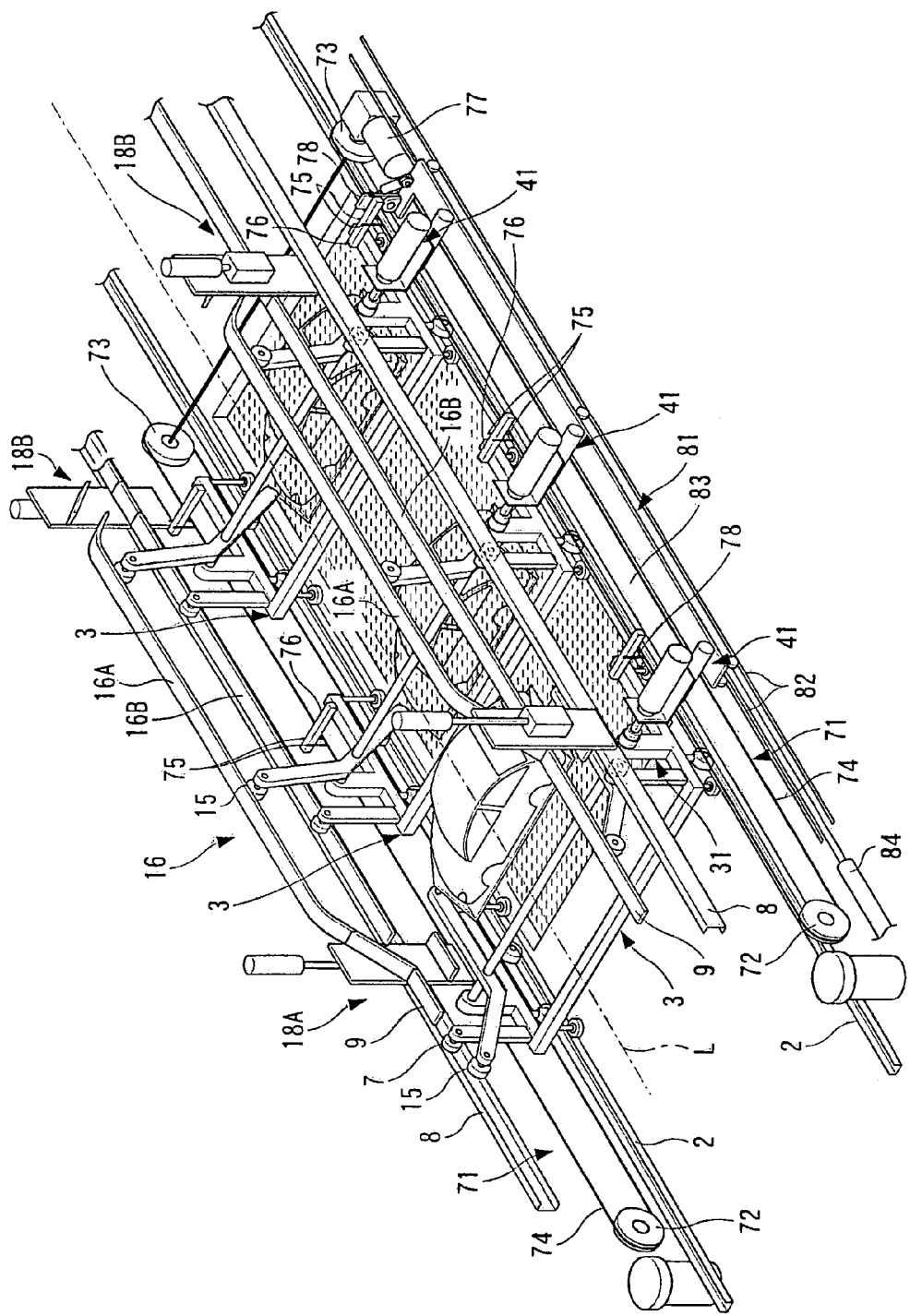
FIG. 11 is a perspective view of a dip tank section in a coating line apparatus according to a second embodiment of the present invention.

In the first embodiment, the conveyance speed of the conveyance carriages 3 was controllable to a desired speed in accordance with the coating time, and the like, but in this second embodiment, a conveyance line apparatus is described, with reference to FIG. 11, which is used in cases where the speed of the conveyance carriages 3 has little effect on the coating of the vehicle bodies M. Members which are the same as those of the preceding embodiment are similarly labelled and description thereof is omitted here.

The conveyance drive device located corresponding to a dip tank 1 is constituted by a chain drive conveyance device 71. In other words, a conveyance chain 74 is wound about an idle sprocket 72 and a drive sprocket 73 located respectively in front and rear positions on either side of the dip tank 1, and engaging hooks 75 are provided at prescribed positions on each of the conveyance chains 74. On the other hand, passive rods 76 which interlock with the engaging hooks 75 are provided respectively in a projecting fashion on the left and right-hand sides of the conveyance carriage 3. Consequently, at the position where the conveyance chain 74 reverses around the idle sprocket 72, an engaging hook 75 interlocks with the passive rod 76 projecting on either side of the conveyance carriage 3, and the conveyance carriage 3 is caused to move thereby. Thereupon, at the position where the conveyance chain 74 reverses about the drive sprocket 73, the engaging hook 75 is separated from the passive rod 76. The left and right-hand drive sprockets 73 are connected and coupled by means of a drive shaft, and furthermore, they are driven in rotation by means of a conveyance drive device, for example, an electric motor 77 provided on the right end portion of the drive shaft, via a reducing gear mechanism, thereby causing the conveyance chains 74 to be driven.

Moreover, a plurality of, for example, three, travelling carriages 81 fitted with angle adjusting drive devices 44 are provided movably in a parallel fashion along the coating line L via guide rails 82, on the outer side of the right-hand side chain drive conveyance device 71. Angle adjusting drive sections 41 of angle adjusting devices 17 are provided respectively corresponding to each one of a plurality of, for example, three, conveyance carriages 3, on the carriage frames 83 of the travelling carriages 81.

Moreover, a passive member 78 capable of engaging with the front face of the passive rod 76 on the conveyance carriage 3 is provided on the front portion of the carriage frame 83, in a projectable and retractable fashion with respect to the conveyance carriage 3 by means of a projecting and retracting device, in such a manner that the drive force of the conveyance chain 74 from the chain drive type conveyance device 71 is transmitted to the travelling carriage 81 via the passive rod 76 and the passive member 78. Furthermore, a return drive cylinder (return path linear drive device) 84 for returning the travelling carriage 81 to a starting position on the front side, along the guide rails 82, is also provided.

Therefore, at the position where the drive chain 74 turns about the idle sprocket 72, an engaging hook 75 interlocks with a passive rod 76 on the conveyance carriage 3 and the conveyance carriage 3 is moved along the path of the coating line L. When the travelling carriage 81 is at rest at the starting position thereof, the passive rod 76 abuts against the passive member 78 in a projecting position, and the travelling carriage 81 is coupled to the conveyance carriage 3 and moved in synchronization with same.

Furthermore, when coating has been finished for the last conveyance carriage 3, the engaging hook 75 separates from the passive rod 76, the passive member is retracted, and the passive rod 76 is separated therefrom, whereupon the travelling carriage 81 is moved back to its starting position by means of the return drive cylinder 84.

According to the second embodiment described above, it is possible to display similar beneficial effects to those of the first embodiment, apart from the fact that the speed of movement and the separation intervals of the conveyance carriages 3 are maintained at uniform values.

In the second embodiment described above, an intermittent travel system was adopted for the travel mode of the travelling carriages 43, 81, whereby the travelling carriages 43, 81 are caused to move back and forth reciprocally, and the travelling carriages 43 are caused to wait at standby in front of the dip tank 1 during the coating operation, but it is also possible to adopt a continuous travel system by providing an endless type travel path in which a plurality of travel carriages 43, 81 are caused to travel in a cyclical fashion.

Third Embodiment

Figure 12:
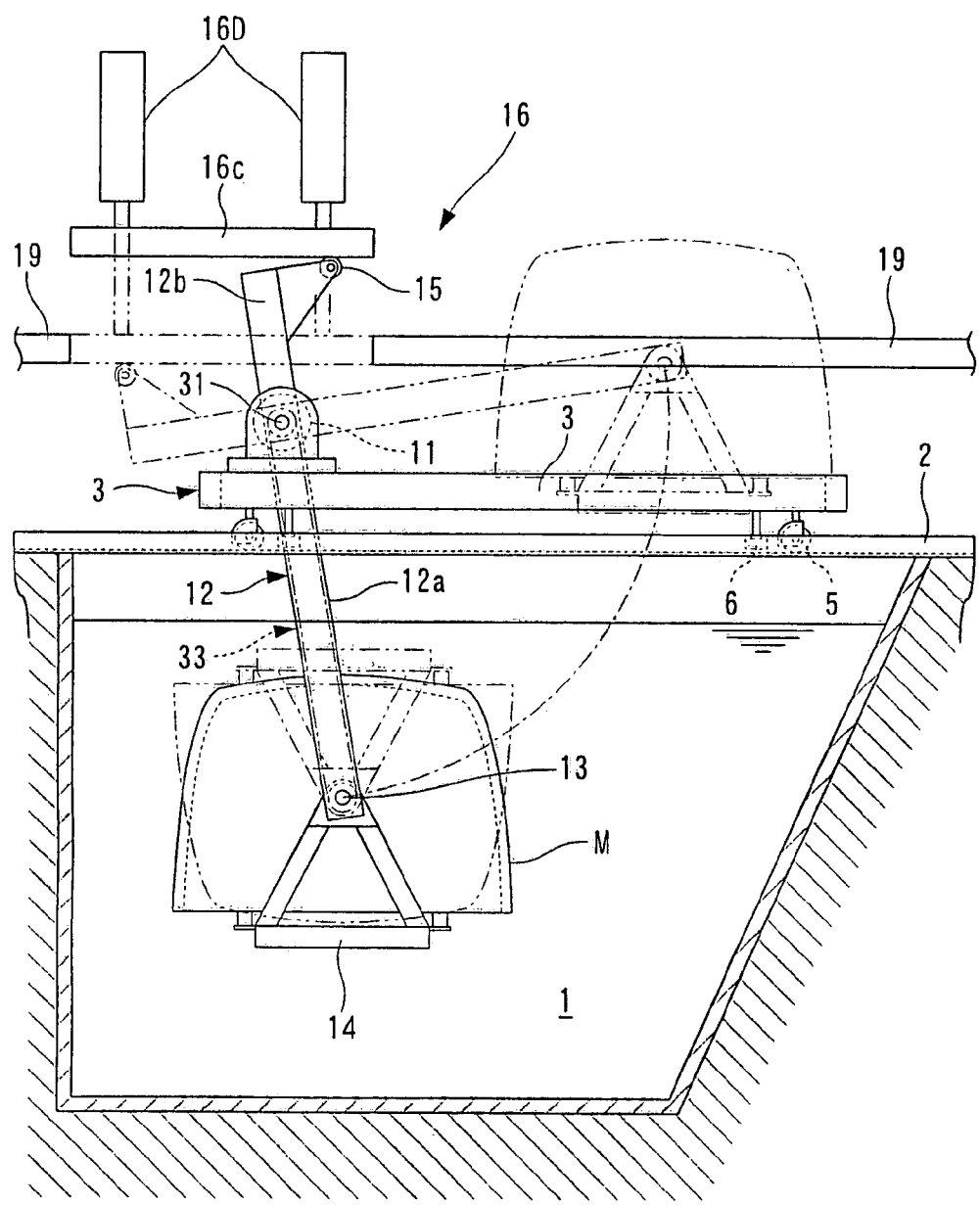
FIG. 12 is an illustrative diagram of a coating operation in a coating line apparatus according to a third embodiment of the present invention.

As shown in FIG. 12, in a third embodiment of a coating line apparatus, it is possible to adopt a composition wherein tilting arms 21 are caused to incline downwards, thereby immersing a vehicle body M in a coating liquid, in addition to which, the angle of the vehicle body M is controlled and the rotating arms 21 are then rotated upwards thus removing the vehicle body M from the coating liquid, while the conveyance carriage 3 remains in a halted state.

In other words, here, the arm tilting device 16 is constituted in such a fashion that an operating cam rail 16C is provided raisably and lowerably in a portion of the restricting rail 19, in a position corresponding to the cam rollers 15 of the conveyance carriage 3 in a halt position, and the operating cam rail 16C is driven so as to be raised or lowered, by a raising and lowering drive device 16D. Furthermore, the angle adjusting drive section 31 omits the travelling carriages 43, and comprises an angle adjusting drive device (not illustrated) located in a fixed state in accordance with the halt position of the conveyance carriage 3 at the dip tank 1.

According to this embodiment, the length of the dip tank 1 can be shortened, and hence the coating line L can also be shortened. Moreover, the angle adjusting drive section 31 can be simplified, in addition to which the travelling carriages 43 and carriage coupling devices 48, 49 can be omitted, thereby making it possible to simplify the apparatus.

Fourth Embodiment

Figure 13:
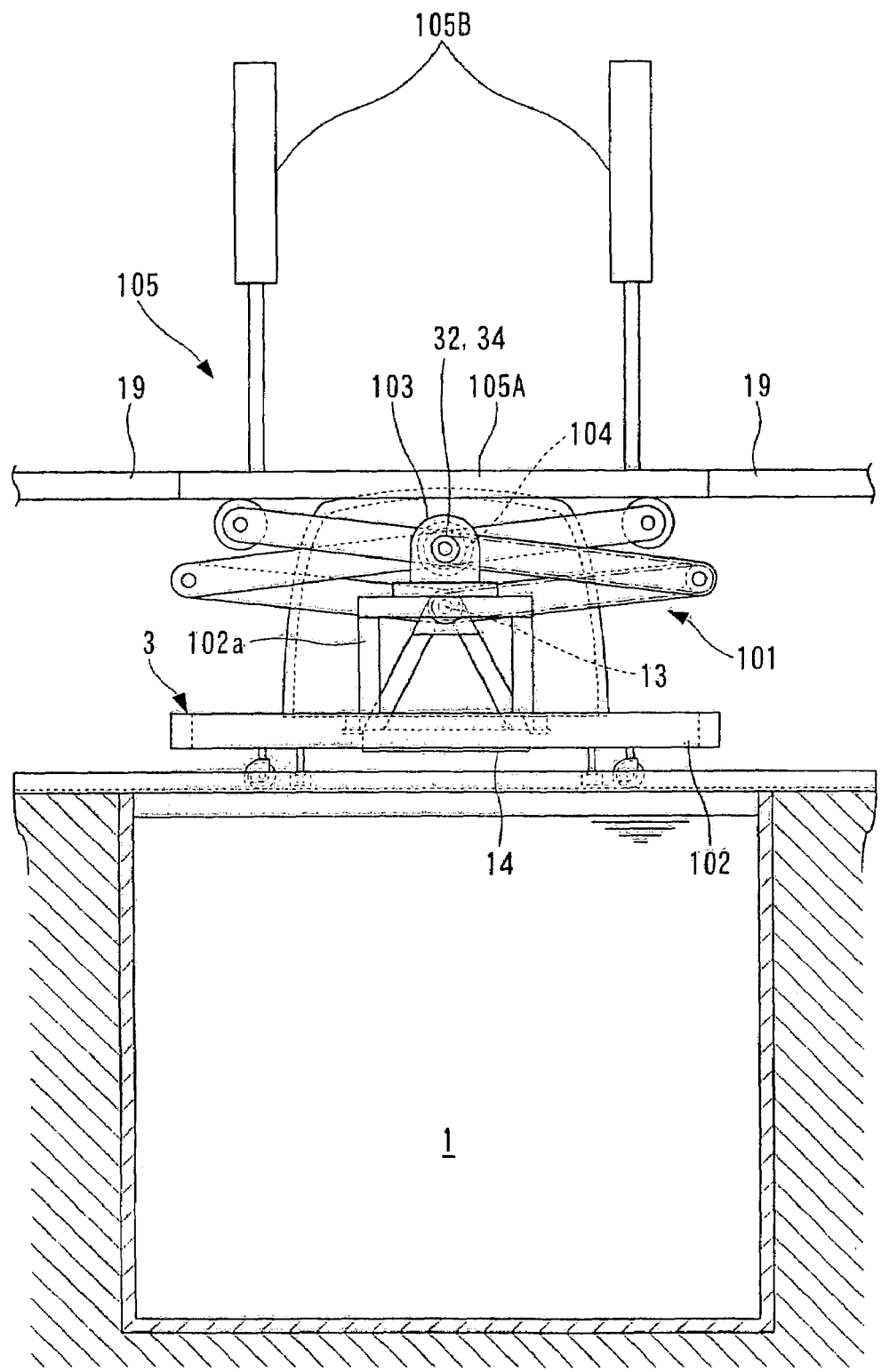
FIG. 13 is a side view of a conveyance carriage in a dip tank section of a coating line apparatus according to a fourth embodiment of the present invention.
Figure 14:
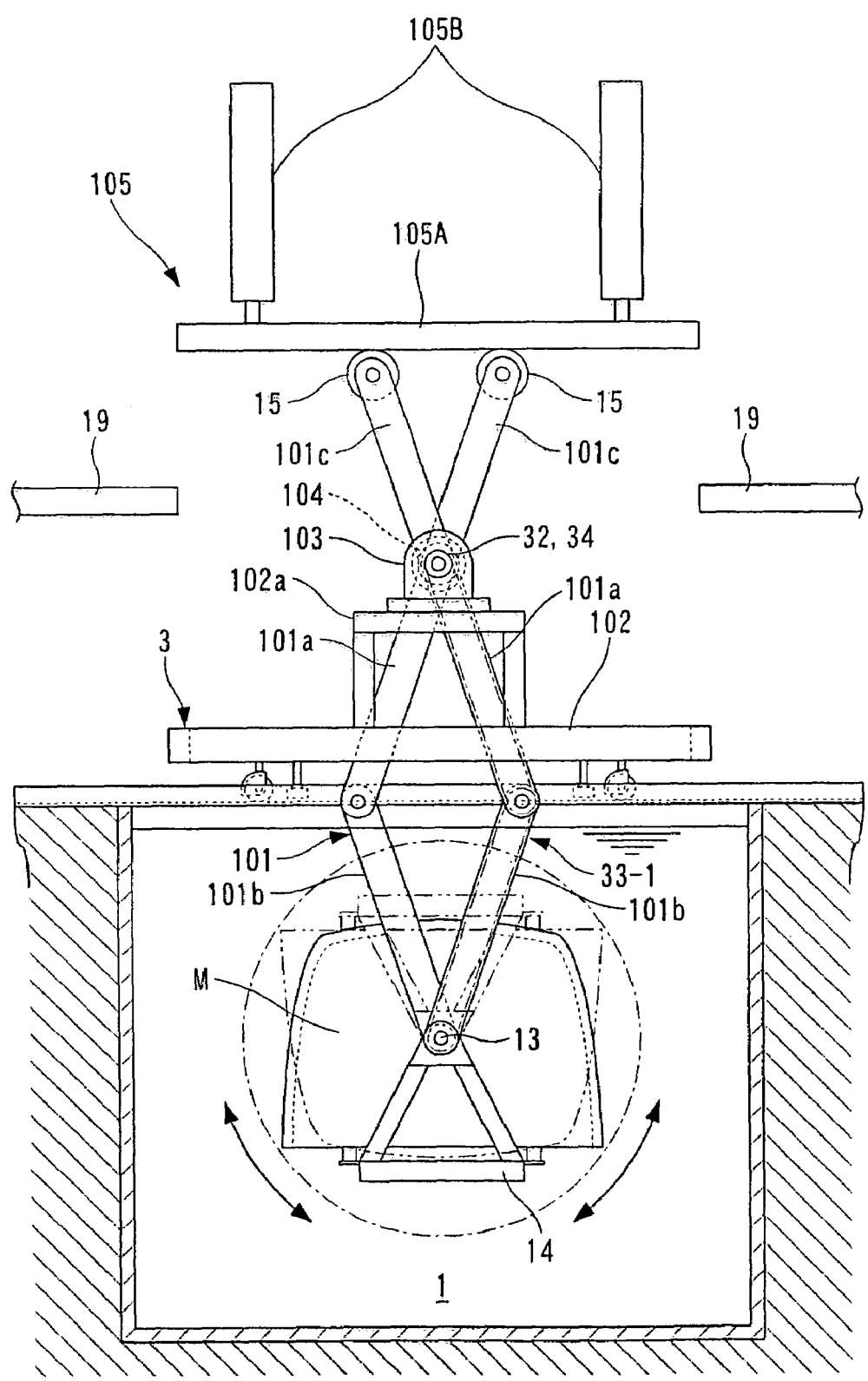
FIG. 14 is a side view of the conveyance carriage showing a state of coating in the coating line apparatus.

In the first to third embodiments, the vehicle body supporting frame 14 is raised and lowered by means of tilting arms 12 which are rotated upwards and downwards, but as illustrated in FIG. 13 and FIG. 14, in this fourth embodiment, the operating arms are constituted by parallel link arms 101 based on a pantograph system, in such a manner that the vehicle body supporting frame 14 is raised and lowered in a vertical direction. Members which are the same as those of the previous embodiments are similarly labelled, and description thereof is omitted here.

Namely, a support bearing 103 is provided on a suspension section 102a of a carriage frame 102 of a conveyance carriage 3 formed having a square frame shape in plan view, and a pair of left and right-hand parallel link arms 101 are supported extendably in the downward direction on the support bearing 103, by means of a support axle 104. These parallel link arms 101 each comprise a pair of front and rear base side arms 101a supported on the support axle, a pair of front and rear front side arms 101b which couple the front end sections of the front and rear base side arms 101a with a rotating shaft 13 of a vehicle body supporting frame 14, in a freely rotatable fashion, and passive arm sections 101c connecting in an upward direction from the base end sections of the base side arms 101a, cam rollers 15 being provided respectively on the front ends of the front and rear passive arm sections 101c.

Similarly to the third embodiment, this fourth embodiment involves a composition in which the vehicle body M is immersed while the conveyance carriage 3 is in a halted state, and here the arm operating device 105 is constituted by operating cam rails 105A located above the dip tank 1 on either side thereof, and a drive device 105B which raises and lowers the operating cam rails 105A.

A wound transmission mechanism 33-1 provided on the angle adjusting passive section 31 of an angle adjusting device 17 is fitted into either one of the front side part or the rear side part of the base side arm 101a and front side arm 101b (in the diagram, the front arms), and is coupled in a linear fashion by means of an intermediate sprocket.

Furthermore, the angle adjusting drive section, although not illustrated, omits the travelling carriage 43, and an angle adjusting drive device (not illustrated) is provided in a fixed position, in the halt position of the conveyance carriage 3 corresponding to the dip tank 1.

In the composition above, when the conveyance carriage 3 is stationary in a halt position, the operating cam rail 105A is raised by the drive device 105B, the cam rollers 15 are caused to approach each other due to weight of the vehicle body supporting frame 14 and the vehicle body M, and the front and rear passive arm sections 101c close, whereby the parallel link arms 101 extend in the downward direction. Thereby, the vehicle body supporting frame 14 is caused to descend, and the vehicle body M is immersed in the coating liquid in the dip tank 1. At the same time, the angle adjusting shaft of the angle adjusting drive device (not illustrated) is coupled with a coupling 35 provided rotatably on the end portion of the support axle 104. The wound transmission mechanism 33' is driven by the angle adjusting drive device, via the angle adjusting shaft, the coupling 34 and the transmission shaft 32, and the vehicle body supporting frame 14 is caused to rotate via the rotating shaft 13, whereby the vehicle body M is controlled to an optimum angle for introduction into the coating liquid, an optimum angle for immersion while in the coating liquid (coating angle), and an optimum angle for removal from the coating liquid.

According to the fourth embodiment described above, it is possible to control the vehicle body M to an optimum angle for introduction into the coating liquid, an optimum angle for immersion while in the coating liquid (coating angle), and an optimum angle for removal from the coating liquid, in addition to which, since a composition is adopted whereby the vehicle body supporting frame 14 can be raised and lowered in a vertical direction, then the length of the dip tank 1 in the direction of the line can be shortened, and hence the coating line L can be shortened and the conveyance carriages 3 can be made more compact.

In the respective embodiments described above, the present invention is applied to a coating line apparatus, and a coating liquid is contained in the dip tanks 1, but it is also possible to perform washing of a conveyance object, by accommodating a washing liquid in washing tanks, or to perform plating of a conveyance object by accommodating a plating solution in plating tanks.

Moreover, in the respective embodiments described above, a friction roller device 21 or chain drive type conveyance device 71 was adopted as a conveyance drive device for the conveyance carriages 3, but it is also possible to adopt a rack and pinion type drive device, in a similar fashion, as an external drive system. Furthermore, self-propelling type drive devices may also be fitted to the conveyance carriages 3 in a self-propelling drive system.

Moreover, in the embodiments described above, the drive section of the arm tilting device 16 and the angle adjusting drive section 41 were provided separately from the conveyance carriages 3, but it is also possible to drive the tilting arms by providing a rotational drive device in each conveyance carriage 3, or to drive the angle adjusting passive section 31.

Furthermore, in the embodiments described above, the conveyance carriages 3 and the travelling carriages 43 are located in such a manner that they travel along the floor surface, but the conveyance carriages 3 and the travelling carriages 43 may also be arranged movably on the travel rails and guide rails provided to extend on the ceiling.

What is claimed is:

1. A conveyance method for a processing step, comprising:
    while a movable body is travelling along a processing line including a processing liquid tank located at a prescribed position or while the movable body is stopped,
    operating an operating arm supported on the movable body in a downward direction, and rotating a supporting body provided on a front end section of the operating arm about an axis in a lateral direction of the processing line, introducing a conveyance object supported on the supporting body into a processing liquid in the processing liquid tank thereby processing the conveyance object, and removing the conveyance object from the processing liquid;
    rotating the supporting body in accordance with the shape of the conveyance object thereby controlling an angle of the conveyance object, upon introduction of the conveyance object into the processing liquid;
    rotating the supporting body in accordance with the shape of the conveyance object thereby controlling the angle of the conveyance object, during immersion and processing of the conveyance object in the processing liquid; and
    rotating the supporting body in accordance with the shape of the conveyance object thereby controlling the angle of the conveyance object, upon removal of the conveyance object from the processing liquid.

2. The conveyance method for a processing step according to claim 1, further comprising:
    operating the operating arm in the downward direction by means of a drive section of an arm operating device provided separately from the movable body; and
    rotating the supporting body about an axis in the lateral direction of the processing line by means of a drive section of an angle adjusting device located separately from the movable body.

3. A conveyance apparatus for a processing step, comprising:
    a plurality of movable bodies capable of travelling along a processing line:
    a processing liquid tank located below the processing line;
    a conveyance drive device for causing the movable bodies to travel;
    an operating arm supported operably in a downward direction on a respective one of the movable bodies;
    a supporting body held on the front end section of the operating arm rotatably about a rotating shaft, and supporting a conveyance object;
    an arm operating device for operating the operating arm downward, said arm operating device comprising a driven member connected to and moving downward the operating arm, and an operating member located along the processing line and guiding the driven member; and
    an angle adjusting device capable of adjusting the angle of the conveyance object by rotating the supporting body,
    wherein the operating arm is caused to operate downward by the arm operating device while the respective one of the movable bodies is moved along the processing line by the conveyance drive device or while the respective one of the movable bodies being moved along the processing line is stopped, the conveyance object supported on the supporting body is immersed in the processing liquid in the processing liquid tank, and the supporting body is rotated by means of the angle adjusting device in accordance with the shape of the conveyance object, thereby controlling the angle of the conveyance object upon introduction into the processing liquid, the angle thereof during processing in the processing liquid, and the angle thereof upon removal from the processing liquid can be controlled respectively.

4. The conveyance apparatus for a processing step according to claim 3, wherein said angle adjusting device comprises a drive section and an angle adjusting passive section, and wherein the drive section of the angle adjusting device comprises:
    an angle adjusting drive device capable of moving in synchronization with the movable body;
    an angle adjusting shaft provided on the angle adjusting drive device; and
    a coupling mechanism capable of coupling and decoupling the angle adjusting shaft to and from the angle adjusting passive section, and capable of rotating the supporting body.

5. The conveyance apparatus for a processing step according to claim 3, wherein the angle adjusting device comprises a drive section and an angle adjusting passive section, and wherein the drive section of the angle adjusting device comprises an angle adjusting drive device capable of moving in synchronization with the respective one of the movable bodies, an angle adjusting shaft provided on the angle adjusting drive device, and a coupling mechanism capable of coupling and decoupling the angle adjusting shaft to and from the angle adjusting passive section and capable of rotating the supporting body, wherein the angle adjusting passive section includes a transmission mechanism for operatively connecting a transmission shaft member provided coaxially on a supporting shaft supporting the operating arm and connected to the angle adjusting shaft, and the rotating shaft of the supporting body.

6. The conveyance apparatus for a processing step according to claim 3, wherein the angle adjusting device comprises a drive section and an angle adjusting passive section, and wherein the drive section of the angle adjusting device comprises an angle adjusting drive device capable of moving in synchronization with the respective one of the movable bodies, an angle adjusting shaft provided on the angle adjusting drive device, and a coupling mechanism capable of coupling and decoupling the angle adjusting shaft to and from the angle adjusting passive section and capable of rotating the supporting body, wherein the angle adjusting drive device is located on a travelling carriage capable of travelling reciprocally in parallel to the processing line, the travelling carriage including a coupling mechanism coupled to the respective one of the movable bodies and travelling in synchronization with the respective one of the movable bodies.

7. The conveyance apparatus for a processing step according to claim 3, wherein the arm operating device comprises a cam roller connected to and tilting downward the operating arm, and a cam rail located along the processing line and guiding the cam roller, wherein the cam rail is arranged in a plurality of number along the processing line and a switching device is located respectively at an input section where the cam roller is introduced onto the cam rail and an output section where the cam roller is removed from the cam rail, wherein at least one of the cam rails comprises a non-operating cam rail for allowing the tilting arm to pass without moving downward.

8. The conveyance apparatus for a processing step according to claim 3, further comprising a processing control device for controlling the angle adjusting device, the arm operating device, and the conveyance drive device on the basis of the shape of the conveyance object.

9. A conveyance apparatus for a processing step, comprising:
a plurality of conveyance carriages capable of travelling along a processing line;
a processing liquid tank located below the processing line;
a conveyance drive device for causing the conveyance carriages to travel;
a tilting arm supported on a respective one of conveyance carriages to be rotatable in a downward direction about a tilting shaft;
a supporting body for supporting a conveyance object, the supporting body being held on the front end section of the tilting arm to be rotatable about a rotating shaft in a width direction of the coating line;
an arm tilting device for moving the tilting arm in a downward direction, the arm tilting device comprising;
a cam roller located on an end portion of the tilting arm opposite to the supporting body; and
a cam rail located along the processing line in the vicinity of the processing liquid tank and guiding the cam roller,
wherein the cam rail is arranged in a plurality of numbers along the processing line, and a switching device is located at an input section where the cam roller is introduced onto the cam rail and at an output section where the cam roller is removed from the cam rail respectively, the switching device switching the cam rail to be introduced thereonto with the cam roller, and
wherein at least one of the cam rails comprises a non-operating cam rail for allowing the tilting arm to pass without moving downward; and
an angle adjusting device capable of adjusting the angle of the conveyance object by rotating the supporting body,
wherein the tilting arm is operated downward by the arm tilting device while the respective one of the conveyance carriages is being moved along the processing line by the conveyance drive device, the conveyance object supported on the supporting body is immersed in a processing liquid in the processing liquid tank, and the supporting body is rotated by means of the angle adjusting device in accordance with the shape of the conveyance object, thereby controlling the angle of the conveyance object upon introduction into the processing liquid, the angle thereof during processing in the processing liquid, and the angle thereof upon removal from the processing liquid can be controlled respectively.

10. The conveyance apparatus for a processing step according to claim 9, and further comprising an arm operating device wherein:
the arm operating device comprises an angle adjusting drive section located on a travelling carriage capable of travelling along the processing line in the vicinity of the processing liquid tank, and an angle adjusting passive section located on the respective one of the conveyance carriages and moving the tilting arm in a downward direction, and
the drive section comprises an angle adjusting drive device capable of moving the travelling carriage in synchronization with the conveyance carriage, an angle adjusting shaft driven to rotate by the angle adjusting drive device, and a carriage coupling device capable of connecting and disconnecting the angle adjusting shaft to and from the angle adjusting passive section,
the travelling carriage including a coupling mechanism mounted thereon and connected to the respective one of the conveyance carriages to travel in synchronization with the respective one of the conveyance carriages.

11. A conveyance apparatus for a processing step, comprising:
a plurality of movable bodies capable of travelling along a processing line:
a processing liquid tank located below the processing line;
a conveyance drive device for causing the movable bodies to travel;
an operating arm supported operably in a downward direction on a respective one of the movable bodies;
a supporting body held on the front end section of the operating arm rotatably about a rotating shaft, and supporting a conveyance object;
an arm operating device for operating the operating arm downward, the arm operating device comprising:
a driven member connected to and moving downward the operating arm;
an operating member located along the processing line and guiding the driven member;
a drive section separated from the respective one of the movable bodies and located in the vicinity of the processing liquid tank; and
a passive section provided on the respective one of the movable bodies and operating the operating arm downward by means of the drive section; and
an angle adjusting device capable of adjusting the angle of the conveyance object by rotating the supporting body,
wherein the operating arm is caused to operate downward by the arm operating device while the respective one of the movable bodies is moved along the processing line by the conveyance drive device or while the respective one of the movable bodies being moved along the processing line is stopped, the conveyance object supported on the supporting body is immersed in the processing liquid in the processing liquid tank, and the supporting body is rotated by means of the angle adjusting device in accordance with the shape of the conveyance object, thereby controlling the angle of the conveyance object upon introduction into the processing liquid, the angle thereof during processing in the processing liquid, and the angle thereof upon removal from the processing liquid can be controlled respectively.

* * * * *